United States Patent

Succi et al.

[11] Patent Number: 5,968,468
[45] Date of Patent: Oct. 19, 1999

[54] GASES AND THE ENSURANCE OF EXTREMELY LOW LEVELS OF HYDROGEN

[75] Inventors: Marco Succi; Valerio Furlan, both of Milan, Italy

[73] Assignee: SAES Getters S.p.A., Lainate, Italy

[21] Appl. No.: 08/944,032

[22] Filed: Sep. 23, 1997

Related U.S. Application Data

[63] Continuation of application No. 08/431,684, May 2, 1995, abandoned, which is a continuation of application No. 08/278,975, Jul. 21, 1994, abandoned, which is a continuation of application No. 07/947,986, Sep. 21, 1992, abandoned, which is a continuation of application No. 07/375,823, Jul. 5, 1989, abandoned.

[30] Foreign Application Priority Data

Sep. 26, 1988 [IT] Italy ............................. 22073A88

[51] Int. Cl.[6] ................................................ C01B 3/00
[52] U.S. Cl. ..................... 423/248; 423/210; 423/219; 423/230; 423/245.1; 423/247
[58] Field of Search .................... 423/210, 248, 423/262, 351, 219, 230, 245.1, 247; 252/181.2, 181.3, 181.6

[56] References Cited

U.S. PATENT DOCUMENTS

| | | | |
|---|---|---|---|
| 1,154,172 | 9/1915 | Brownlee et al. | 423/351 |
| 4,306,887 | 12/1981 | Barosi et al. | 55/74 |
| 4,312,669 | 1/1982 | Boffito et al. | 420/422 |
| 4,405,487 | 9/1983 | Harrah et al. | 423/248 |
| 4,515,528 | 5/1985 | Young | 423/248 |

*Primary Examiner*—Wayne Langel
*Attorney, Agent, or Firm*—Hickman Stephens & Coleman

[57] ABSTRACT

An apparatus is described for the removal of impurity gases such as $O_2$, $CH_4$, CO, $CO_2$ and $H_2$ from impure inert gases such as rare gases and $N_2$. The apparatus comprises an impure inert gas inlet, a housing containing first and second gas sorbing materials and a purified gas outlet. The first gas sorbing material may be a Zr—V—Fe getter alloy if the gas to be purified is a rare gas, whereas it may be a Zr—Fe alloy if the gas to be purified is $N_2$. The second gas sorbing material is a Zr—Al alloy which ensures that the purified inert gas has an extremely low level of hydrogen. A process for the removal of impurity gases from inert gases and ensuring an extremely low level of hydrogen in the purified gas is also described.

19 Claims, 2 Drawing Sheets

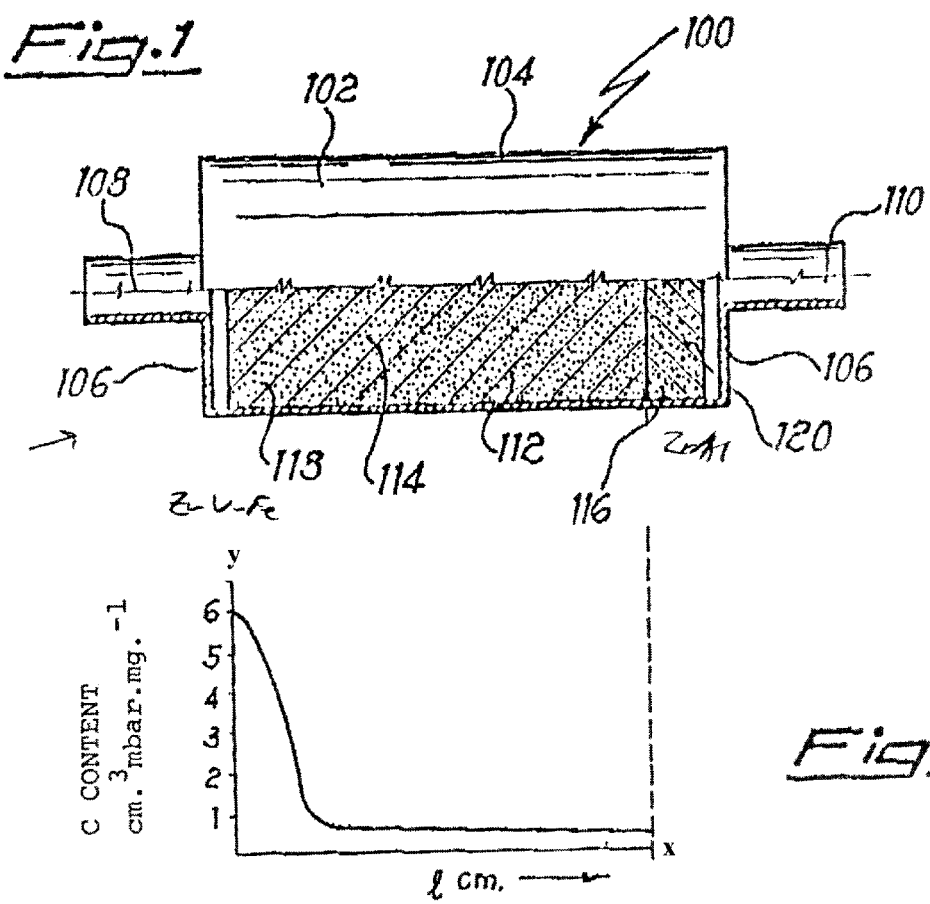
Fig.1
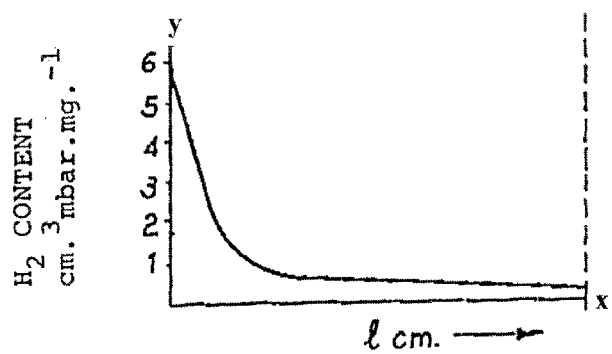
Fig.2
Fig.3
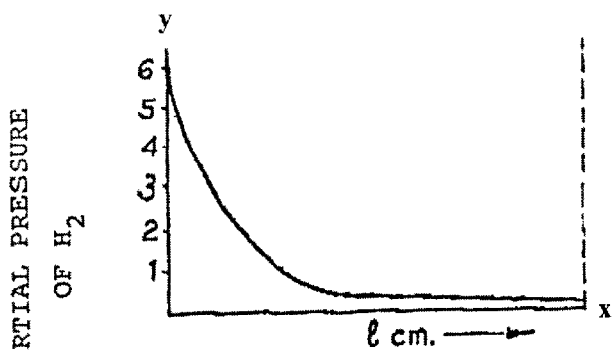
Fig.4

GASES AND THE ENSURANCE OF EXTREMELY LOW LEVELS OF HYDROGEN

This application is a continuation of application Ser. No. 08/431,684 filed May 2, 1995, abandoned, which is a continuation of Ser. No. 08/278,975 filed Jul. 21, 1994, abandoned, which is a continuation of Ser. No. 07/947,986 filed Sep. 21, 1992, abandoned, which is a continuation of Ser. No. 07/375,823 filed Jul. 5, 1989, abandoned.

BACKGROUND TO THE INVENTION

Many manufacturing processes require the use of pure inert gases such as the rare or noble gases, helium, neon, argon, krypton, xenon or nitrogen. One particular example of their use is in the manufacture of semiconductor devices. Before use impure inert gases must be purified by removing contaminant gases such as CO, $CO_2$, $CH_4$, $O_2$ and $H_2$. GB Patent Application Publication Nos. 2,177,079 A and 2,177,080 A describe methods for the purification of inert gases to remove these impurity gases. However these two GB Patent Application Publications give no information relative to the problems of the maintenance of extremely low levels of hydrogen.

Although there is no quantitative measure available which relates the percentage of defects found during the manufacture of semiconductor devices with the partial pressure of hydrogen present during the manufacturing process, it is generally believed that the lower the hydrogen partial pressure, the lower the number of defects found.

BRIEF OBJECTS OF THE PRESENT INVENTION

It is therefore an object of the present invention to provide an improved apparatus for the removal of impurity gases from impure inert gases such as rare gases and nitrogen.

It is another object of the present invention to provide an apparatus for the purification of inert gases which ensures that the purified inert gas has an extremely low level of hydrogen.

It is yet another object of the present invention to provide a process for the removal of impurity gases from impure inert gases while ensuring an extremely low level of hydrogen in the purified outlet gas.

These and other objects and advantages of the present invention will become evident to those skilled in the art with reference to the following drawings and descriptions wherein;

BRIEF DESCRIPTION OF THE DRAWINGS

FIG. 1 is a partially cutaway cross section of an apparatus of the present invention for the removal of impurity gases from inert gases which ensures that the purified gas has an extremely low level of hydrogen.

FIG. 2 is a graph showing the concentration of the impurity CO as distributed throughout the apparatus shown in FIG. 1 after said apparatus has been purifying inert gas for a certain period of time.

FIG. 3 is a graph having a curve similar to that of FIG. 2 but shows the concentration of the hydrogen impurity.

FIG. 4 is a graph showing the partial pressure of hydrogen throughout the apparatus of FIG. 1.

DETAILED DESCRIPTION OF THE INVENTION

Figure 5:
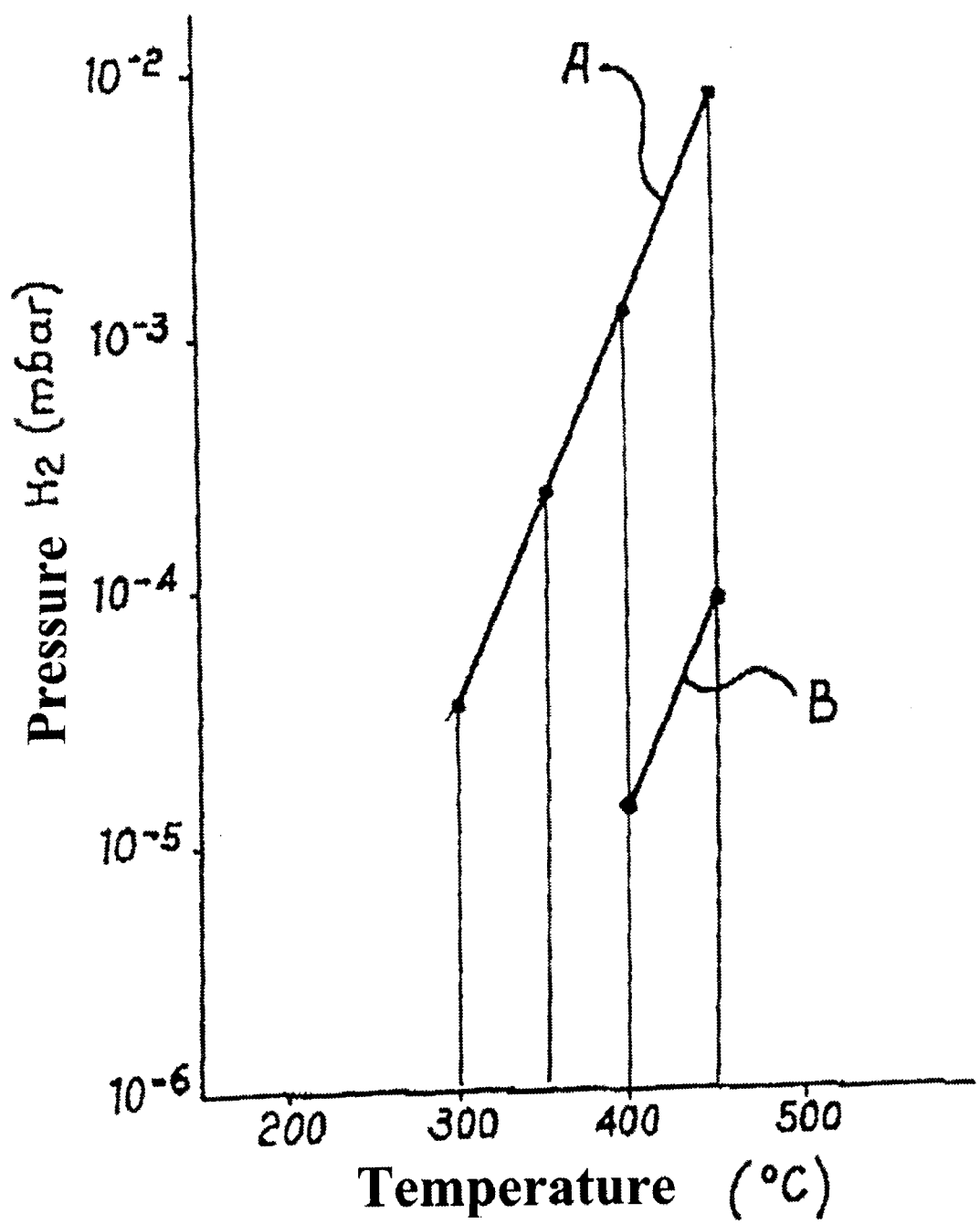
FIG. 5 is a graph showing the $H_2$ partial pressure in a purified inert gas of a prior art purifier and a purifier of the present invention.

Referring now to the drawings and in particular to FIG. 1 there is shown a gas purification apparatus 100 for the removal of impurity gases from inert gases. By inert gases is meant the rare or noble gases helium, neon, argon, krypton and xenon as well as nitrogen. Gas purification apparatus 100 comprises a housing 102 in the form of a cylindrical sheath 104, which is preferably of a metal such as stainless steel. Cylindrical sheath 104 is provided with end caps 106, 106' which are attached thereto in a gas tight manner. End caps 106, 106' are again preferably of stainless steel. End cap 106 has attached thereto an inert gas inlet 108 in the form of hollow cylinder, again preferably of stainless steel. End cap 106' is provided with a purified inert gas outlet 110. Gas outlet 110 is again in the form of a cylinder and preferably made of stainless steel. Cylindrical sheath 104 and end caps 106, 106' define a hollow space 112 which contains a first gas sorbing material 114 and a second gas sorbing material 116. The first gas sorbing material 114 is preferably a non-evaporable getter alloy chosen from the group consisting of a) an alloy of Zr—V—Fe and;
b) an alloy of Zr—Fe.

Said first gas sorbing material 114 should consist of a powder having an average particle size of less than about 125 /µm in the form of a multiplicity of pellets formed by compressing and/or thermally sintering the powder. These pellets of first gas sorbing material 114 are located in a first region 118 adjacent to inert gas inlet 104. If the gas to be purified is a rare or noble gas such as argon then the first gas sorbing material 114 should be an alloy of Zr—V—Fe. In this case the first gas sorbing material is a non-evaporable getter alloy of Zr—V—Fe whose weight composition is such that percentages by weight of the three elements when plotted on a ternary composition diagram, lie within a polygon having as its corners the points defined by:

a) 75% Zr - 20% V - 5% Fe;
b) 45% Zr - 20% V - 35% Fe;
c) 45% Zr - 50% V - 5% Fe.

If the inert gas to be purified is nitrogen then the first gas sorbing material 114 is a non-evaporable getter alloy of Zr—Fe and preferably consists of from 15 to 30% by weight of Fe, balance Zr.

The second gas sorbing material 116 is a non-evaporable getter alloy having a composition 5–30% by weight Al, balance Zr. The second gas sorbing material 116 is in the form of pellets of compressed powder, the powder having an average particle size of less than 125/µm, said pellets being located in the housing in a second region 120 adjacent to purified inert gas outlet 110.

The process of the present invention for the removal of impurity gases from impure inert gas and ensuring an extremely low level of hydrogen in the purified outlet gas comprises the steps of passing the impure inert gas through an inlet to a housing and contacting the impure inert gas with the first gas sorbing material chosen from the group consisting of:

a) a non-evaporable getter alloy of Zr—V—Fe, and;
b) a non-evaporable getter alloy of Zr—Fe, to produce a purified inert gas. The purified inert gas is then passed through and contacts a second gas sorbing material to produce a purified inert gas having an extremely low level of hydrogen. The second gas sorbing material 116 is a non-evaporable getter alloy having a composition 5 to 30% by weight aluminum balance zirconium. The purified inert gas having an extremely low level of hydrogen then passes through the purified inert gas outlet 110.

EXAMPLE 1

This example is not representative of the present invention but has been designed to aid in the understanding of the present invention.

An inert gas purification apparatus comprising a stainless steel housing of 7 cm length and 1 cm diameter, provided with an inert gas inlet and an inert gas outlet was filled with pellets of compressed powder of $Zr_2Fe$ having a particle size less than 125/μm. The pellets were cylindrical in shape having a diameter of 4 mm and a height of 3 mm. The total weight of pellets used was 14 g. The apparatus was heated to 330° C. and impure $N_2$ gas was allowed to flow through the apparatus.

The impurity levels of the nitrogen gas were as follows:

IMPURITY LEVELS ppm

|   | $O_2$ | $CH_4$ | $H_2$ | CO  | $CO_2$ |
|---|-------|--------|-------|-----|--------|
| A | 10    | 10     | 9     |     | 9      |
| B | 9     | 8.5    | 7.5   | 9.5 |        |
| C | 9     | 9      | 8.5   | 8.5 |        |

A, B and C are arbitrary identification letters for successive cylinders of impure $N_2$ gas used in the present example. After a total of about 350 hours of flowing impure $N_2$ gas through the apparatus, samples of the $Zr_2Fe$ were taken at various positions along the length of the apparatus and analyzed for their content of C, $O_2$, $N_2$ and $H_2$.

FIG. 2 shows the results of the C content measurements plotting the C content in $cm^3$ $mbar.mg^{-1}$ on the y axis as a function of position 1 in cm of the sample from the inert gas inlet 108.

FIG. 3 is a similar curve for $H_2$.

FIG. 4 shows the expected profile of the hydrogen partial pressure within the apparatus. This example shows that sorption of the impurities takes place in a progressive manner through the apparatus.

EXAMPLE 2

This example is not representative of the present invention but has been designed to aid in the understanding of the present invention.

An apparatus similar to that of FIG. 1 was filled with 720 g of pellets of compressed powder of 70% Zr - 24.6% V - 5.4% Fe having a particle size less than 125/μm. The pellets were cylindrical in shape having a diameter of 6 mm and a height of 4 mm.

Argon gas of five nines declared purity was passed through the apparatus held at a fixed temperature, at an inlet pressure of 1.3 bar and an outlet pressure of 1 bar (1 atmosphere). The Ar gas flow was 1 liter min $^{-1}$. After approximately 1 hour the $H_2$ partial pressure was measured and plotted on the graph of FIG. 5. The temperature was changed and the test repeated.

The points were plotted for the temperatures 300° C., 350° C., 400° C. and 450° C. leading to line A on FIG. 5.

EXAMPLE 3

This example represents the present invention.

Example 2 was repeated except that a portion of the housing adjacent to the gas inlet was filled with 650 g of Zr—V—Fe pellets identical to those used in Example 2. The remaining space adjacent the gas outlet was filled with 70 g of identical sized pellets of 95% by weight of 84% Zr - 16% Al alloy of particle size less than 125μm intimately mixed with 5% by weight of Al powder and compressed. The test was repeated as for Example 2 at 400° C. and 450° C. During each test the Zr—V—Fe alloy and the Zr—Al alloy were at the same temperature. The results are shown as line B on FIG. 5.

As can be seen the resulting hydrogen impurity level of the outlet gas has been reduced by two orders of magnitude i.e., by a factor of 100.

EXAMPLE 4

Examples 2 and 3 are repeated except that the Zr—V—Fe pellets are replaced by pellets of $Zr_2Fe$ and the gas to be purified is $N_2$. The outlet partial pressure of $H_2$ is considerably reduced when Zr—Al pellets are present adjacent the purified gas outlet.

Although the invention has been described in considerable detail with reference to certain preferred embodiments designed to teach those skilled in the art how best to practice the invention, it will be realized that other modifications may be employed without departing from the spirit and scope of the appended claims.

What is claimed is:

1. A method for removing hydrogen from impure inert gases containing hydrogen and at least one oxygenating gas, comprising:

providing a conduit having an inlet, an outlet, and first and second gas sorbing materials disposed therein, said first gas sorbing material being a nonevaporable getter alloy selected from the group consisting of an alloy of Zr—V—Fe and an alloy of Zr—Fe, said second gas sorbing material being a nonevaporable getter alloy having a composition of 5 wt % to 30 wt % of Al and the balance Zr; and flowing an impure inert gas containing hydrogen and at least one oxygenating gas from said inlet of said conduit to said outlet of said conduit such that said impure inert gas first contacts said first gas sorbing material and then contacts said second gas sorbing material.

2. The method of claim 1, wherein the first gas sorbing material is a nonevaporable getter alloy of Zr—V—Fe having a composition such that the weight percentages of the components, when plotted on a ternary composition diagram, lie within a polygon having corners defined by the points:

a) 75 wt % Zr, 20 wt % V, and 5 wt % Fe;

b) 45 wt % Zr, 20 wt % V, and 35 wt % Fe; and c) 45 wt % Zr, 50 wt % V, and 5 wt % Fe.

3. The method of claim 2, wherein the second gas sorbing material has a composition of 16 wt % Al and the balance Zr.

4. The method of claim 1, wherein the first and second gas sorbing materials are in the form of powder particles having an average particle size of less than 125 μm.

5. The method of claim 4, wherein the powder particles have been compacted to form pellets.

6. The method of claim 1, wherein the first gas sorbing material has a composition of 70 wt % Zr, 24.6 wt % V, and 5.4 wt % Fe.

7. The method of claim 6, wherein the second gas sorbing material has a composition of 16 wt % Al and the balance Zr.

8. The method of claim 1, wherein the first gas sorbing material has a composition of 15 wt % to 30 wt % of Fe and the balance Zr.

9. The method of claim 8, wherein the second gas sorbing material has a composition of 16 wt % Al and the balance Zr.

10. The method of claim 1, wherein the first gas sorbing material is $Zr_2Fe$.

11. The method of claim 10, wherein the second gas sorbing material has a composition of 16 wt % Al and the balance Zr.

12. A method for removing hydrogen from impure inert gases containing hydrogen and at least one oxygenating gas, comprising:

providing a conduit having an inlet, an outlet, and first and second gas sorbing materials disposed therein, said first gas sorbing material being a nonevaporable getter alloy having a composition of 70 wt % Zr, 24.6 wt % V, and 5.4 wt % Fe, said second gas sorbing material being a nonevaporable getter alloy having a composition of 16 wt % Al and the balance Zr; and flowing an impure inert gas containing hydrogen and at least one oxygenating gas from said inlet of said conduit to said outlet of said conduit such that said impure inert gas first contacts said first gas sorbing material and then contacts said second gas sorbing material.

13. The method of claim 12, wherein the first and second gas sorbing materials are in the form of powder particles having an average particle size of less than 125 μm.

14. The method of claim 13, wherein the powder particles have been compacted to form pellets.

15. The method of claim 12, wherein the first gas sorbing material is located proximate to the inlet of the conduit and the second gas sorbing material is located proximate to the outlet of the conduit.

16. A method for removing hydrogen from impure inert gases containing hydrogen and at least one oxygenating gas, comprising:

providing a conduit having an inlet, an outlet, and first and second gas sorbing materials disposed therein, said first gas sorbing material being $Zr_2Fe$, said second gas sorbing material being a nonevaporable getter alloy having a composition of 16 wt % Al and the balance Zr; and flowing an impure inert gas containing hydrogen and at least one oxygenating gas from said inlet of said conduit to said outlet of said conduit such that said impure inert gas first contacts said first gas sorbing material and then contacts said second gas sorbing material.

17. The method of claim 16, wherein the first and second gas sorbing materials are in the form of powder particles having an average particle size of less than 125 μm.

18. The method of claim 17, wherein the powder particles have been compacted to form pellets.

19. The method of claim 16, wherein the first gas sorbing material is located proximate to the inlet of the conduit and the second gas sorbing material is located proximate to the outlet of the conduit.

* * * * *